(12) United States Patent
Frey et al.

(10) Patent No.: US 12,262,128 B2
(45) Date of Patent: Mar. 25, 2025

(54) IMAGE SENSOR CONTROL CIRCUITRY AND IMAGE SENSOR CONTROL METHOD

(71) Applicant: Sony Group Corporation, Tokyo (JP)

(72) Inventors: Matthias Frey, Stuttgart (DE); Diederik Paul Moeys, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 273 days.

(21) Appl. No.: 17/863,426

(22) Filed: Jul. 13, 2022

(65) Prior Publication Data
US 2023/0026592 A1  Jan. 26, 2023

(30) Foreign Application Priority Data

Jul. 21, 2021  (EP) .................................... 21186925

(51) Int. Cl.
*H04N 25/50* (2023.01)
*G06V 10/30* (2022.01)
*G06V 20/40* (2022.01)

(52) U.S. Cl.
CPC ............. *H04N 25/50* (2023.01); *G06V 10/30* (2022.01); *G06V 20/44* (2022.01)

(58) Field of Classification Search
None
See application file for complete search history.

(56) References Cited

U.S. PATENT DOCUMENTS

| 10,345,447 B1 | 7/2019 | Hicks | |
|---|---|---|---|
| 11,482,007 B2* | 10/2022 | Shrivastava | ........... G06V 10/56 |
| 11,588,987 B2* | 2/2023 | Kukreja | ................. H04N 25/42 |
| 11,871,156 B2* | 1/2024 | Bisulco | ................... H04L 43/04 |
| 11,900,685 B2* | 2/2024 | Pfeiffer | ................. B60W 30/08 |
| 2007/0133068 A1 | 6/2007 | Yu | |
| 2010/0315505 A1* | 12/2010 | Michalke | ................ G06T 7/251 |
| | | | 348/118 |
| 2014/0368712 A1* | 12/2014 | Park | ...................... H04N 25/745 |
| | | | 348/308 |
| 2015/0030204 A1* | 1/2015 | Lee | .......................... G06T 7/246 |
| | | | 382/103 |
| 2016/0011654 A1* | 1/2016 | Lee | ........................ G06N 3/049 |
| | | | 345/156 |
| 2016/0093273 A1* | 3/2016 | Wang | ...................... G01S 3/781 |
| | | | 345/428 |
| 2019/0007678 A1 | 1/2019 | Perez-Ramirez et al. | |

(Continued)

FOREIGN PATENT DOCUMENTS

| WO | 2020/034078 A1 | 2/2020 |
|---|---|---|
| WO | 2020/152585 A1 | 7/2020 |

(Continued)

*Primary Examiner* — Cynthia Segura (74) *Attorney, Agent, or Firm* — XSENSUS LLP (57) ABSTRACT

The present disclosure generally pertains to image sensor control circuitry for event-based controlling of an image sensor, the image sensor control circuitry being configured to:

obtain events from a plurality of event-based vision elements of an event-based vision sensor;

determine event groups based on an event-detection property; and generate an imaging control signal for controlling the imaging elements of the image sensor based on the event groups, for imaging with imaging element groups corresponding to the event groups.

17 Claims, 5 Drawing Sheets

(56) References Cited

U.S. PATENT DOCUMENTS

| | | | |
|---|---|---|---|
| 2020/0005468 A1* | 1/2020 | Paul | G06V 10/25 |
| 2020/0084403 A1 | 3/2020 | Suh et al. | |
| 2021/0105421 A1* | 4/2021 | Kukreja | H04N 23/951 |
| 2021/0279890 A1* | 9/2021 | Mou | G06T 7/215 |
| 2022/0036082 A1* | 2/2022 | Varadarajan | G06T 5/92 |
| 2022/0157083 A1* | 5/2022 | Jandhyala | H04N 23/20 |
| 2022/0253634 A1* | 8/2022 | Shrivastava | G06V 10/758 |
| 2023/0021408 A1* | 1/2023 | Cohen-Duwek | B25J 9/1664 |
| 2023/0156355 A1* | 5/2023 | Kim | G06T 7/136 |
| | | | 348/135 |
| 2023/0360398 A1* | 11/2023 | Canini | H04N 25/707 |
| 2024/0169577 A1* | 5/2024 | Vejarano | G06V 10/761 |

FOREIGN PATENT DOCUMENTS

| | | |
|---|---|---|
| WO | 2020/152655 A1 | 7/2020 |
| WO | 2021/021453 A1 | 2/2021 |
| WO | 2021/117676 A1 | 6/2021 |

* cited by examiner

IMAGE SENSOR CONTROL CIRCUITRY AND IMAGE SENSOR CONTROL METHOD

CROSS-REFERENCE TO RELATED APPLICATION

The present application claims priority to European Patent Application No. 21186925.0, filed Jul. 21, 2021, the entire contents of which are incorporated herein by reference.

TECHNICAL FIELD

The present disclosure generally pertains to image sensor control circuitry and an image sensor control method.

TECHNICAL BACKGROUND

Systems including both an event-based (dynamic) vision (EVS/DVS) sensor and an image sensor are generally known. For example, hybrid sensors are known in which EVS pixels are combined with imaging pixels, for example for ROI (region of interest) selection/imaging, or the like.

Moreover, methods for controlling image sensors are known, such as brightness-dependent imaging, focus-dependent imaging, or the like.

Although there exist techniques for controlling an image sensor, it is generally desirable to provide image sensor control circuitry and an image sensor control method.

SUMMARY

According to a first aspect, the disclosure provides image sensor control circuitry for event-based controlling of an image sensor, the image sensor control circuitry being configured to:
  obtain events from a plurality of event-based vision elements of an event-based vision sensor;
  determine event groups based on an event-detection property; and
  generate an imaging control signal for controlling the imaging elements of the image sensor based on the event groups, for imaging with imaging element groups corresponding to the event groups.

According to a second aspect, the disclosure provides an image sensor control method for event-based controlling of an image sensor, the method comprising:
  obtaining events from a plurality of event-based vision elements of an event-based vision sensor;
  determining event groups based on an event-detection property; and
  generating an imaging control signal for controlling the imaging elements of the image sensor based on the event groups, for imaging with imaging element groups corresponding to the event groups.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
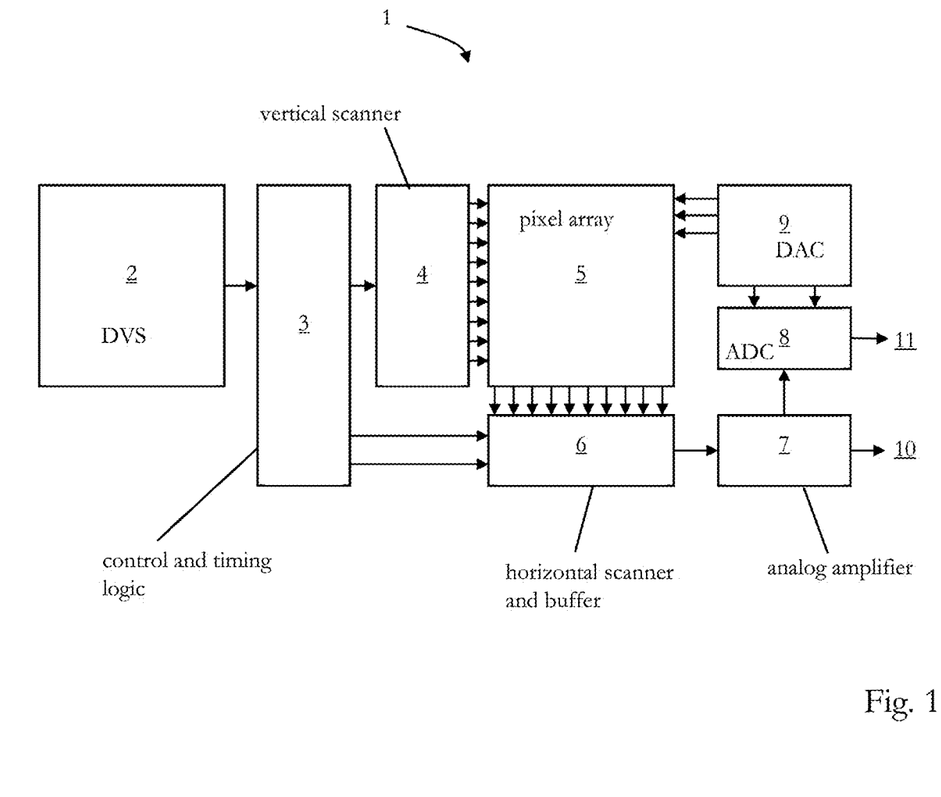
FIG. 1 shows a block diagram of an embodiment of image sensor control circuitry according to the present disclosure.

Before a detailed description of the embodiments under reference of FIG. 1 is given, general explanations are made.

As mentioned in the outset, image sensor control methods are generally known. It has been recognized that, based on events, certain pixels of an image sensor may be controlled/driven whereas other pixels may not be controlled/driven. Events may be generated in an event-based vision sensor (EVS) which may have a lower latency and a higher dynamic range than an image sensor. Moreover, events may be generated asynchronously, such that they may be obtained independent of frames of the image sensor. Hence, the EVS may be operated with a lower power than the image sensor It has been further recognized that a frame rate of the image sensor may be adapted based on the generated events, if the frame rate is only increased for certain imaging pixels corresponding to event-pixels, e.g. for a region of interest imaging.

Hence, the frame rate of the image sensor, which may be limited by power consumption and/or electronics may be partially increased (i.e. for certain imaging pixels) while keeping or lowering the frame rate for other imaging pixels. In some embodiments, the frame rate may be increased asynchronously in correspondence to the events. Thus, bandwidth and energy may be saved.

It has further been recognized that it may be possible to save energy and bandwidth (and reduce necessary data rates) by only acquiring relevant information, i.e. information which is indicative of a change in the image.

Therefore, some embodiments pertain to image sensor control circuitry for event-based controlling of an image sensor, the image sensor control circuitry being configured to: obtain events from a plurality of event-based vision elements of an event-based vision sensor, determine event groups based on an event-detection property; and generate an imaging control signal for controlling the imaging elements of the image sensor based on the event groups, for imaging with imaging element groups corresponding to the event groups.

Image sensor control circuitry may pertain to any entity or multitude of entities which may be suitable to control an image sensor, such as a processor, e.g. a CPU (central processing unit), GPU (graphics processing unit), FPGA (field-programmable gate array), or the like. Moreover, one or multiple computer(s), server(s), camera(s), or the like, may correspond to or include image sensor control circuitry according to the present disclosure. In some embodiments, image sensor control circuitry may include an image sensor and/or an EVS, whereas in some embodiments, the image sensor control circuitry may not include sensors.

For performing event-based control of the image sensor, the image sensor control circuitry may be configured to obtain events from a plurality of event-based vision elements of an event-based vision sensor (EVS) (also referred to as dynamic vision sensor (DVS)), which is generally known. Such an EVS may be configured to asynchronously generate events in response to light being incident on the event-based vision element (e.g. event pixel).

Based on the obtained events, event groups may be determined, which may be indicative of groups of event-based vision elements in which events have been generated/detected.

The groups may be indicative of clusters of event-based vision elements, neighboring event-based vision elements, or the like. Grouping may be carried out based on predetermined rules or based on a neural network (or any other artificial intelligence), or the like. Moreover, the groups may include groups of event-based vision elements for which events have been detected and/or groups in which no events have been detected or the events do not fulfill a predetermined grouping rule.

A cluster may be generated based on a collection of events and assigning them to the same (detected) object, such that, in contrast to a fixed ROI, a cluster size and/or position may depend on an object size and/or position, such that the object may be tracked already on a sensor level without any need for post-processing.

In some embodiments, the imaging element groups may be predetermined, e.g. the image sensor may be subdivided into several parts, such that the imaging element groups may be static, but in some embodiments, the imaging element groups may be dynamically adapted based on the events.

Based on the event groups, an imaging control signal may be generated. The imaging control signal may be used for controlling the imaging elements of the image sensor. For example, if a number of the event-based vision elements and the imaging elements is the same, a one-to-one correspondence between the event-based vision elements and the imaging elements may be established, such that an imaging control signal may only be generated/adjusted for the imaging elements which correspond to the event-based vision elements which belong to the event groups or in which an event has been generated or detected.

Depending on the respective resolutions of the EVS and the image sensor, other correspondences may be established. For example, one imaging element may be controlled based on two or more event-based vision elements and another imaging element of the same image sensor may be controlled based on only one event-based vision element, or the like.

Based on the event groups, imaging element groups may be generated or determined which may correspond to the event groups. Correspondence may refer to a one-to-one correspondence or any other correspondence. The imaging element groups may thus have a similar or the same shape as the event groups or the shape may be different and may depend on a mapping of the event-based vision elements to the imaging elements.

Hence, according to the present disclosure, an imaging control signal may be generated only for those imaging elements in imaging element groups which correspond to the event groups.

The imaging control signal may be indicative for the imaging elements to perform an imaging, to change a framerate, or the like.

The imaging control signal may be an asynchronous signal for the image sensor or may be synchronized to a predetermined frame rate.

In some embodiments, the event-detection property includes at least one of an event density and an apparent motion.

Event density may refer to a frequency (in time and/or space) of events in one or more event-based vision elements. For example, if the event density of an event-based vision element is above a predetermined threshold, it may be added to an event group.

Apparent motion may refer to a (optical) flow of events on the EVS, such that it may seem that the events move on the image sensor, e.g. with a certain speed.

Event density and/or apparent motion may be determined based on, for example, cluster tracking (e.g. median tracking), optic flow segmentation (e.g. event with different or same optic flows may be grouped together), or the like.

Hence, in some embodiments, the event groups are further determined based on at least one of cluster tracking and optic flow segmentation.

For example, based on the optic flow or the event density, event-based vision elements may be predicted in which events might be detected in a future frame, such that imaging elements or imaging elements groups may be determined/pre-assigned for an imaging in that future frame.

In some embodiments, the image sensor control circuitry is further configured to: change a frame rate of the imaging elements based on the determined event groups.

For example, a frame rate may be kept or decreased for imaging element groups corresponding to event groups in which no events (or not enough events) have been detected or may be increased (or kept the same while other groups are decreased) for imaging element groups corresponding to event groups in which events have been detected (or are above a predetermined threshold, as discussed herein).

Hence, a high frame rate in a region of interest (e.g. a changing part of an image) may be used while recording a non-changing part of the image at a lower frame rate or not imaging the non-changing part at all. Hence, power and bandwidth may be reduced.

In some embodiments, the imaging element group is representative of a region of interest, as discussed herein.

In some embodiments the image sensor control circuitry is further configured to: change an imaging element group property based on the obtained events.

The imaging element group property may include at least one of a frame rate, a size, a shape, a sensitivity, and a contrast.

The imaging element group property may be indicated by the imaging control signal, such that an imaging may be carried out suitable to the detected events.

In some embodiments the image sensor control circuitry is further configured to: filter background noise for determining the event groups.

For example, noise may be filtered by detecting a spatial and/or temporal correlation of the event-based vision elements, such that the noise which may be present in one or more event-based vision element may be similar or the same in another event-based vision element, if it is spatially or temporally correlated with the one or more event-based vision element. Hence, the grouping may be more exact by detecting the correlation.

By filtering noise, falsely triggered readouts may be decreased or prevented. For example, multiple event-based vision elements may be used to detect and ignore uncorrelated noise events, such that an accuracy of processing stages of each event-based vision element may be increased.

Accordingly, in some embodiments, the image sensor control circuitry is further configured to: detect at least one of temporal and spatial correlation for filtering the background noise.

Hence, in contrast to changing a threshold for removing noise, noise filtering may not change a sensitivity of pixels. If a threshold is set too high, (real) events may not be detected anymore. Hence, sensitivity may need to be kept unto a certain level which is possible according to the present disclosure by detecting the correlation. Moreover, according to the present disclosure, noise may already be removed on a chip/sensor level, such that post-processing effort may be reduced in that regard.

Generally, noise may be decreased, if the EVS and the image sensor provided in a stacked configuration since noise activity caused by parasitic photocurrents may be reduced, because transistors may be isolated from each other.

Moreover, the EVS and the image sensor may be combined in various ways and the present disclosure is not limited to any of those. Furthermore, the present disclosure is not limited to any interface or bus system between the two sensors. For example, a MIPI interface may be used, or any other interface.

For example, an external timer may be used, such that the image sensor may be triggered in a timed manner once at least a part of the EVS triggers, such that further images between regular frames may be added. These additional images may be augmented with a timestamp, for example. If MIPI is used, MSRs (manufacture specific registers) may be utilized for adding a timestamp.

Furthermore, in MUPI, ROI selection may be supported as well as dynamic selection of image bit-depth ("ADC_capability", "ADC_bit_depth" registers), binning, sub-sampling or framerate. For example, an image sensor may run in video mode with a certain framerate (e.g. two-hundred and forty frames per second). If no activity is detected by the EVS, a bandwidth may be reduced by reducing the framerate, the image bit-depth and/or the ROI, such that the data rate and therefore the power consumption may be minimized.

In some embodiments, a number of event-based vision elements is lower than a number of imaging elements, as discussed herein.

For example, if two sensors (i.e. one EVS and one image sensor) are used, a mapping between the two sensors may be carried out, such that an EVS with a lower resolution than the image sensor can be used.

In some embodiments, a hybrid sensor is used which contains event-based vision elements and imaging elements, which may be arranged in a predetermined pattern.

For example, for one macro pixel, a predetermined number of event-based vision elements (one or more) may be surrounded by a (higher) predetermined number of imaging elements. In such embodiments, if events obtained from the event-based vision elements fulfill a predetermined rule (i.e. a predetermined frequency, density, or the like), the surrounding imaging elements may be caused to perform an imaging based on an imaging control signal, as discussed herein.

However, the present disclosure is not limited to the case that the imaging elements surround the event-based vision elements since any pattern may be envisaged by the skilled person, such as a checkerboard pattern, a random pattern, or the like.

Some embodiments pertain to an image sensor control method for event-based controlling of an image sensor, the method including: obtaining events from a plurality of event-based vision elements of an event-based vision sensor; determining event groups based on an event-detection property; and generating an imaging control signal for controlling the imaging elements of the image sensor based on the event groups, for imaging with imaging element groups corresponding to the event groups, as discussed herein.

The image sensor control method may be carried out by image sensor control circuitry according to the present disclosure.

In some embodiments, the event-detection property includes at least one of an event density and an apparent motion, as discussed herein. In some embodiments, the event groups are further determined based on at least one of cluster tracking and optic flow segmentation, as discussed herein. In some embodiments, the image sensor control method further includes: changing a frame rate of the imaging elements based on the determined event groups, as discussed herein. In some embodiments, an imaging element group is representative of a region of interest, as discussed herein. In some embodiments, the image sensor control method further includes: changing an imaging element group property based on the obtained events, as discussed herein. In some embodiments, the imaging element group property includes at least one of a frame rate, a size, a shape, a sensitivity, and a contrast, as discussed herein. In some embodiments, the image sensor control method further includes: filtering background noise for determining the event groups, as discussed herein. In some embodiments, the image sensor control method further includes: detecting at least one of temporal and spatial correlation for filtering the background noise, as discussed herein. In some embodiments, a number of event-based vision elements is lower than a number of imaging elements, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, there is shown a block diagram of image sensor control circuitry according to the present disclosure including a DVS 2, control and timing logic 3, a vertical scanner for row selection 4, a pixel array 5 (i.e. a CMOS (complementary metal-oxide semiconductor) image sensor), horizontal scanner and column buffers 6, an analog amplifier 7, an analog to digital converter (ADC) 8, and a bias generator and digital to analog converter (DAC) 9.

The DVS 2 has a lower resolution than the pixel array 5 and is configured to transmit events to the control and timing logic 3, which in turn generates a control signal for the vertical scanner 4, such that certain rows of pixels of the pixel array 5 are controlled to perform an imaging. Moreover, the horizontal scanner 6 is supplied with a control signal from the control and timing logic 3 which is indicative of which columns are supposed to be scanned, such that only the pixels of the pixel array 5 are read out which correspond to the event groups of the DVS 2.

The signal which is scanned in the horizontal scanner is transmitted to the analog amplifier 7, such that an analog output 10 is generated. Moreover, the signal from the analog amplifier 7 is transmitted to the ADC 8, such that a digital output 11 is generated, which is further generated based on a signal of the bias generator and DAC 9.

The bias generator and DAC 9 is further configured to apply a bias to the pixel array.

It should be noted that the ADC 8 and the bias generator and DAC 9 are omitted in some embodiments, such that only the analog output may be obtained in such embodiments.

Figure 2:
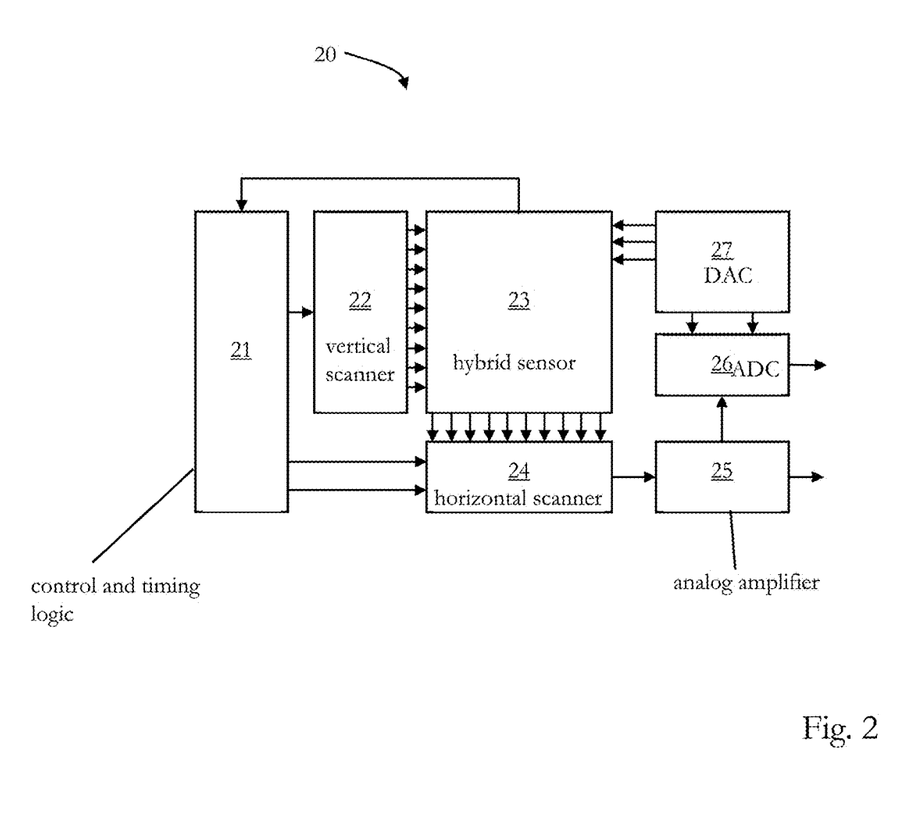
FIG. 2 shows a block diagram of an embodiment of image sensor control circuitry according to the present disclosure in which a hybrid sensor is used.

FIG. 2 depicts a further embodiment of image sensor control circuitry 20 according to the present disclosure in which a hybrid sensor is used which includes EVS pixels and imaging pixels.

The image sensor control circuitry 20 includes control and timing logic 21, a vertical scanner 22, the hybrid sensor 23, a horizontal scanner 24, an analog amplifier 25, an ADC 26, and a bias generator and DAC 27.

Hence, the image sensor control circuitry 20 is similar to the image sensor control circuitry 1 of FIG. 1 and elements which were already described under reference of FIG. 1 are omitted in the following.

The image sensor control circuitry 20 is different from the image sensor control circuitry 1 of FIG. 1 in that a hybrid sensor 23 is used. The hybrid sensor 23 includes a pixel array with interspersed (active) EVS pixels, i.e. a number of EVS pixels is lower than a number of imaging pixels.

Moreover, the EVS pixels have connections to a predetermined number of photodiodes in a selectable ROI, such that changes in the ROI can be detected, and such that these EVS pixels are used to trigger the readout of the ROI.

For control and timing, the hybrid sensor 23 (i.e. the EVS pixels) is fed back to the control and timing logic 21, such that control signals can be generated for the imaging pixels of the hybrid sensor 23.

Each ROI has an own separate readout scanning logic (not depicted).

Figure 3:
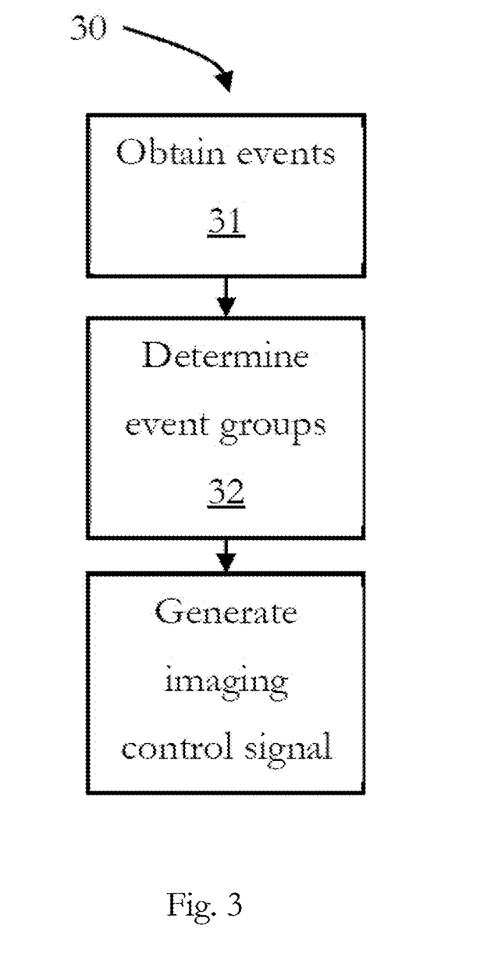
FIG. 3 depicts a block diagram of an embodiment of an image sensor control method according to the present disclosure.

FIG. 3 depicts an embodiments of an image sensor control method 30 according to the present disclosure.

At 31, events are obtained from an EVS, as discussed sensor.

At 32, event groups are determined based on event rules which are predetermined from a neural network.

At 33, an imaging control signal is generated for imaging elements, such that imaging element groups corresponding to the event groups are determined, which are used for imaging, as discussed herein.

Figure 4:
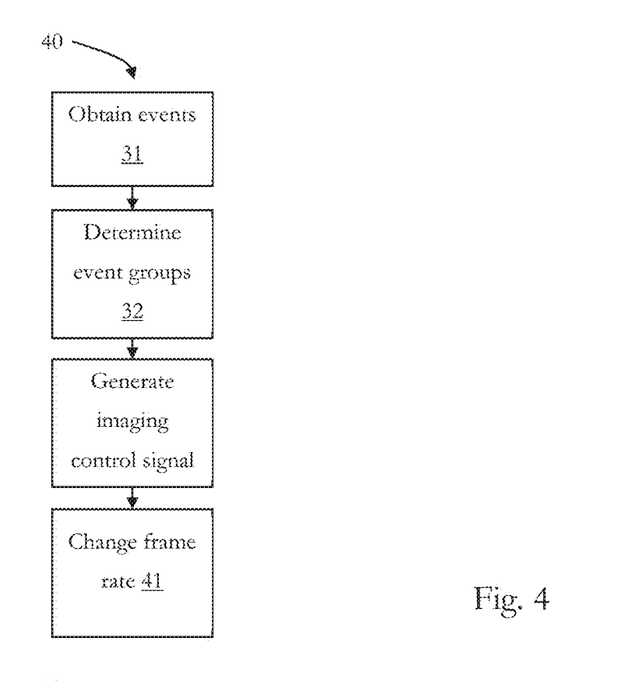
FIG. 4 depicts a block diagram of a further embodiment of an image sensor control method according to the present disclosure in which further a frame rate is changed in image element groups.

FIG. 4 depicts a further embodiment of an image sensor control method 40 according to the present disclosure, which is different from the image sensor control method 30 of FIG. 3 in that, at 41, a frame rate for the imaging element groups which are used for imaging is changed (i.e. increased, in this embodiment) in response to the imaging control signal.

Figure 5:
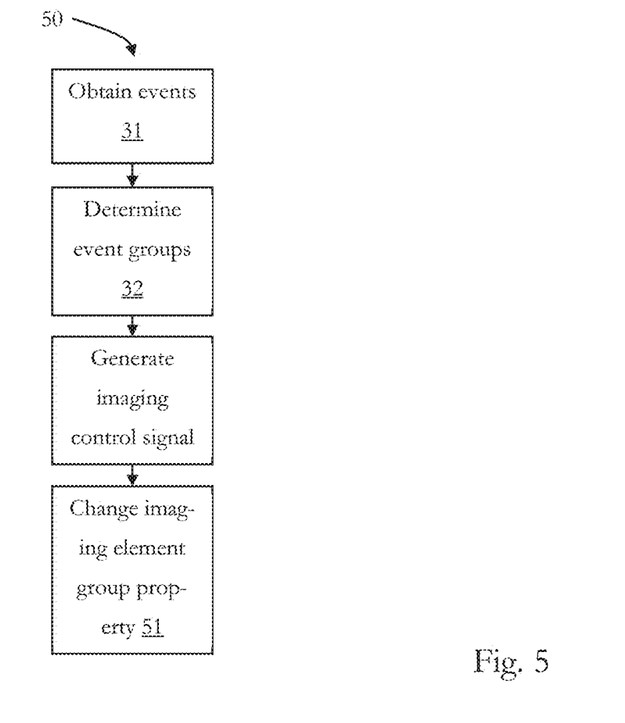
FIG. 5 depicts a block diagram of a further embodiment of an image sensor control method according to the present disclosure in which an imaging element group property is changed.

FIG. 5 depicts a further embodiment of an image sensor control method 50 according to the present disclosure, which is different from the image sensor control method 30 of FIG. 3 in that, at 41, an imaging element group property is changed in response to the imaging control signal, as discussed herein. In this embodiment, the imaging element group property includes a contrast.

Figure 6:
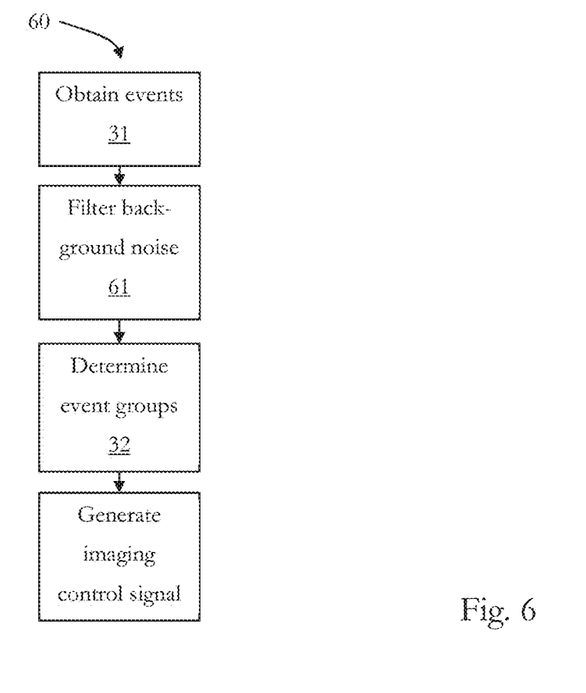
FIG. 6 depicts a block diagram of a further embodiment of an image sensor control method according to the present disclosure in which background noise is filtered in event-based vision elements.

FIG. 6 depicts a further embodiment of an image sensor control method 60 according to the present disclosure, which is different from the image sensor control method 30 of FIG. 3 in that, at 61 (i.e. after the events are obtained at 31), background noise is filtered based on a spatial and temporal correlation, as discussed herein.

It should be recognized that the embodiments describe methods with an exemplary ordering of method steps. The specific ordering of method steps is however given for illustrative purposes only and should not be construed as binding. For example, the ordering of 33 and 41 in the embodiment of FIG. 4 may be exchanged. Also, the ordering of 33 and 51 in the embodiment of FIG. 5 may be exchanged. Further, also the ordering of 32 and 61 in the embodiment of FIG. 6 may be exchanged. Other changes of the ordering of method steps may be apparent to the skilled person.

Please note that the division of the image sensor control circuitry 1 or 20 into units 2 to 9 or 21 to 27 is only made for illustration purposes and that the present disclosure is not limited to any specific division of functions in specific units. For instance, the image sensor control circuitry 1 or 20 could be implemented by a respective programmed processor, field programmable gate array (FPGA) and the like. Moreover, it should be noted that the image sensor control circuitry may refer to a logic instance which is implemented on a processor, such that, in some embodiments, the image sensor control circuitry may only correspond to the control and timing logic 3 or 21 of FIG. 1 or 2.

The method of this disclosure can also be implemented as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) Image sensor control circuitry for event-based controlling of an image sensor, the image sensor control circuitry being configured to:
   obtain events from a plurality of event-based vision elements of an event-based vision sensor;
   determine event groups based on an event-detection property; and
   generate an imaging control signal for controlling the imaging elements of the image sensor based on the event groups, for imaging with imaging element groups corresponding to the event groups.

(2) The image sensor control circuitry of (1), wherein the event-detection property includes at least one of an event density and an apparent motion.

(3) The image sensor control circuitry of (1) or (2), wherein the event groups are determined based on at least one of cluster tracking and optic flow segmentation.

(4) The image sensor control circuitry of claim 1, further configured to:
   is change a frame rate of the imaging elements based on the determined event groups.

(5) The image sensor control circuitry of anyone of (1) to (4), wherein an imaging element group is representative of a region of interest.

(6) The image sensor control circuitry of anyone of (1) to (5), further configured to:

change an imaging element group property based on the obtained events.

(7) The image sensor control circuitry of (6), wherein the imaging element group property includes at least one of a frame rate, a size, a shape, a sensitivity, and a contrast.

(8) The image sensor control circuitry of anyone of (1) to (7), further configured to: filter background noise for determining the event groups.

(9) The image sensor control circuitry of (8), further configured to:

detect at least one of temporal and spatial correlation for filtering the background noise.

(10) The image sensor control circuitry of anyone of (1) to (9), wherein a number of event-based vision elements is lower than a number of imaging elements.

11. An image sensor control method for event-based controlling of an image sensor, the method comprising:

obtaining events from a plurality of event-based vision elements of an event-based vision sensor;

determining event groups based on an event-detection property; and generating an imaging control signal for controlling the imaging elements of the image sensor based on the event groups, for imaging with imaging element groups corresponding to the event groups.

(12) The image sensor control method of (11), wherein the event-detection property includes at least one of an event density and an apparent motion.

(13) The image sensor control method of (11) or (12), wherein the event groups are determined based on at least one of cluster tracking and optic flow segmentation.

(14) The image sensor control method of anyone of (11) to (13), further comprising changing a frame rate of the imaging elements based on the determined event groups.

(15) The image sensor control method of anyone of (11) to (14), wherein an imaging element group is representative of a region of interest.

(16) The image sensor control method of anyone of (11) to (15), further comprising:

changing an imaging element group property based on the obtained events.

(17) The image sensor control method of (16), wherein the imaging element group property includes at least one of a frame rate, a size, a shape, a sensitivity, and a contrast.

(18) The image sensor control method of anyone of (11) to (17), further comprising filtering background noise for determining the event groups.

(19) The image sensor control method of (18), further comprising:

detecting at least one of temporal and spatial correlation for filtering the background noise.

(20) The image sensor control method of anyone of (11) to (19), wherein a number of event-based vision elements is lower than a number of imaging elements.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. Image sensor control circuitry for event-based controlling of an image sensor, the image sensor control circuitry being configured to:

obtain events from a plurality of event-based vision elements of an event-based vision sensor;

determine event groups based on an event-detection property, wherein the event groups are determined based on at least one of cluster tracking and optic flow segmentation;

generate an imaging control signal for controlling the imaging elements of the image sensor based on the event groups, for imaging with imaging element groups corresponding to the event groups;

change a frame rate of the imaging elements based on the determined event groups, wherein the frame rate is increased for imaging element groups corresponding to event groups in which events have been detected and decreased for imaging element groups corresponding to event groups in which no events have been detected; and predict, based on at least one of optic flow and event density, event-based vision elements in which events are to be detected in a future frame, and pre-assign imaging elements or imaging element groups for imaging in the future frame based on the prediction.

2. The image sensor control circuitry of claim 1, wherein the event-detection property includes at least one of an event density and an apparent motion.

3. The image sensor control circuitry of claim 1, wherein an imaging element group is representative of a region of interest.

4. The image sensor control circuitry of claim 1, further configured to:

change an imaging element group property based on the obtained events.

5. The image sensor control circuitry of claim 4, wherein the imaging element group property includes at least one of a frame rate, a size, a shape, a sensitivity, and a contrast.

6. The image sensor control circuitry of claim 1, further configured to:

filter background noise for determining the event groups.

7. The image sensor control circuitry of claim 6, further configured to:

detect at least one of temporal and spatial correlation for filtering the background noise.

8. The image sensor control circuitry of claim 1, wherein a number of event-based vision elements is lower than a number of imaging elements.

9. An image sensor control method for event-based controlling of an image sensor, the method comprising:

obtaining events from a plurality of event-based vision elements of an event-based vision sensor;

determining event groups based on an event-detection property;

generating an imaging control signal for controlling the imaging elements of the image sensor based on the event groups, for imaging with imaging element groups corresponding to the event groups;

changing a frame rate of the imaging elements based on the determined event groups, wherein the frame rate is increased for imaging element groups corresponding to event groups in which events have been detected and decreased for imaging element groups corresponding to event groups in which no events have been detected; and predicting, based on at least one of optic flow and event density, event-based vision elements in which events are to be detected in a future frame, and pre-assign imaging elements or imaging element groups for imaging in the future frame based on the prediction.

10. The image sensor control method of claim 9, wherein the event-detection property includes at least one of an event density and an apparent motion.

11. The image sensor control method of claim 10, wherein the event groups are further determined based on at least one of cluster tracking and optic flow segmentation.

12. The image sensor control method of claim 9, wherein an imaging element group is representative of a region of interest.

13. The image sensor control method of claim 9, further comprising:
   changing an imaging element group property based on the obtained events.

14. The image sensor control method of claim 13, wherein the imaging element group property includes at least one of a frame rate, a size, a shape, a sensitivity, and a contrast.

15. The image sensor control method of claim 9, further comprising:
   filtering background noise for determining the event groups.

16. The image sensor control method of claim 15, further comprising:
   detecting at least one of temporal and spatial correlation for filtering the background noise.

17. The image sensor control method of claim 9, wherein a number of event-based vision elements is lower than a number of imaging elements.

\* \* \* \* \*